Figures 1, 2:
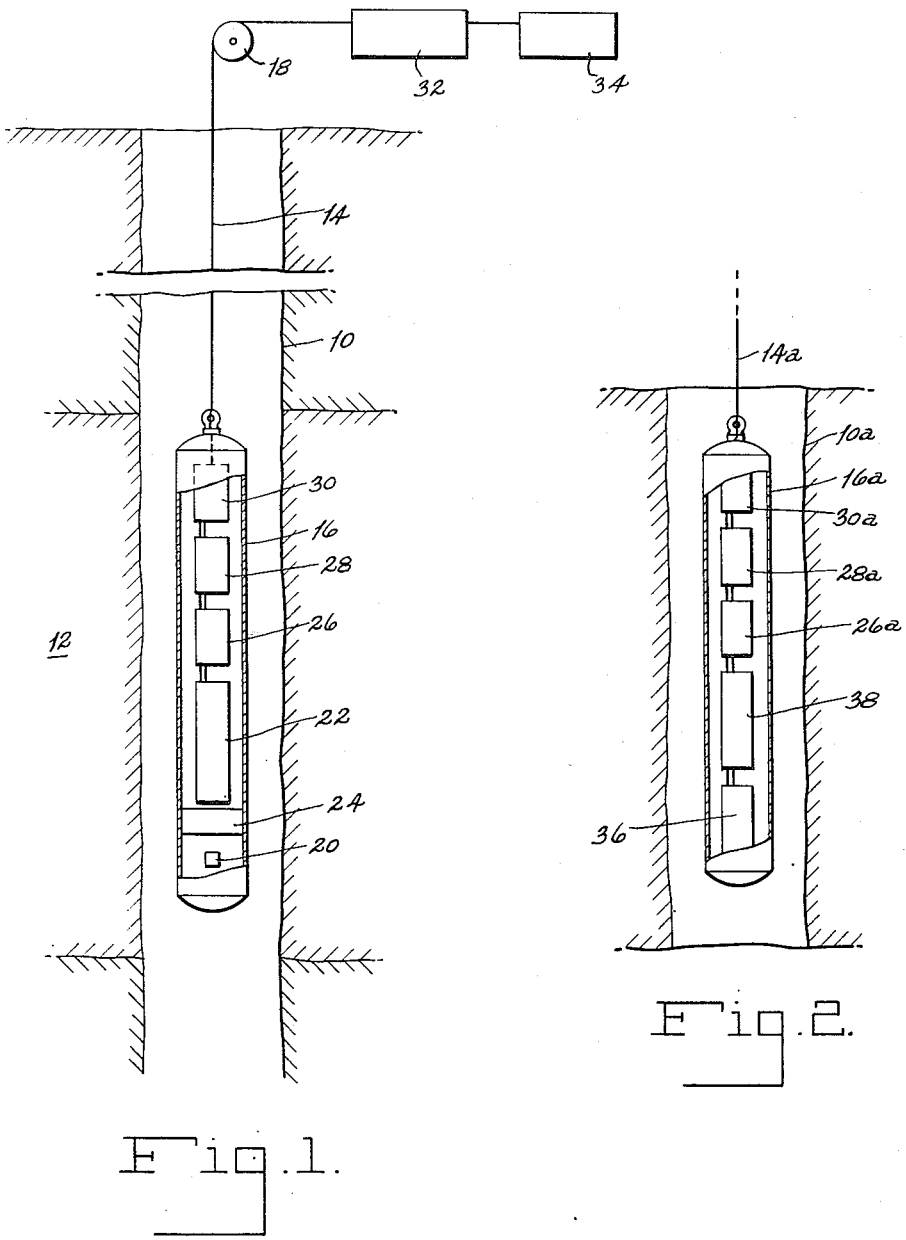

Jan. 12, 1954  G. HERZOG  2,666,146
METHOD AND APPARATUS FOR BORE HOLE LOGGING
Filed March 17, 1950

INVENTOR.
GERHARD HERZOG
BY
ATTORNEYS

Patented Jan. 12, 1954

2,666,146

UNITED STATES PATENT OFFICE 2,666,146

METHOD AND APPARATUS FOR BORE HOLE LOGGING

Gerhard Herzog, Houston, Tex., assignor to The Texas Company, New York, N. Y., a corporation of Delaware Application March 17, 1950, Serial No. 150,309

2 Claims. (Cl. 250—83.6)

This invention relates to the logging of bore holes by radioactivity and more particularly to a method and an apparatus for making such a log when the radioactivity to be measured in the bore holes is intense. The principal object of the invention is the provision of a method and means for detecting radioactivity in the hole and transmitting the detector output to the surface without the detrimental effects usually inherent in transmitting electrical pulses at an extremely high rate over the cable connecting the logging instrument with the recording apparatus at the surface.

In general there are two forms or methods of logging a bore hole by the bombardment of the formations surrounding the hole with primary radiation such as neutrons from a source usually disposed within the logging instrument. In one of these forms neutrons from the source penetrate the formations wherein, due to nuclear collision with the atoms of the formations, secondary radiation in the form of gamma rays may be induced, some of these gamma rays passing back to the hole where their intensity is measured by a gamma ray detector of the pulse producing type, the output of the detector being conducted to the surface where it is recorded in correlation with the depth of the instrument in the hole. In the other method neutrons from the source in the hole bombard and penetrate the formations wherein, depending upon the nature of the formation being bombarded, more or less of the neutrons are scattered and slowed down, some of these slowed neutrons entering the hole where their intensity is measured by means of a neutron detector such as a proportional counter. The output of the neutron detector is transmitted to the surface over the cable where it is recorded.

In another method of radioactivity logging a source of gamma rays such as radium and a detector of gamma rays are mounted within the logging instrument and the detector responds to the gamma rays which originate in the source and are scattered within the surrounding formations, some of these scattered gamma rays reaching the detector to produce pulses therein.

One of the difficulties encountered in these methods of logging, particularly the neutron-gamma ray method (in which neutrons bombard the formation while induced gamma rays are measured), is due to the limitation of the number of pulses which can be transmitted efficiently over the logging cable from the instrument in the hole to the equipment at the surface. In the making of a "natural gamma ray" log this problem is not severe since one is dealing with reasonably low counting rates of a few hundred per second, and pulses at these rates can usually be transmitted over the cable to the surface without trouble. However, in neutron-gamma ray logging the number of gamma rays, i. e., the intensity to be measured, is much higher and the pulses cannot be transmitted efficiently to the surface because of the capacitive influence of the long cable over which the transmission takes place. Occasionally also in neutron-neutron logging where the formation being bombarded contains a considerable amount of hydrogen, the measured scattered returned neutrons are sufficiently intense, or in other words the counting rate is so high that the pulses cannot be clearly transmitted over the cable.

In accordance with the invention a scaling circuit is incorporated into the circuits within the logging instrument and thereby the number of pulses produced by the detector can be reduced by a fixed proportion before transmitting them over the cable. Thus, a circuit providing a scale of four will reduce the pulses by a factor of 4, a scale of eight by a factor of 8 etc. The scaling circuit is made a part of the electronic circuits in the logging instrument ahead of the output amplifying stage which impresses the pulses onto the lower end of the cable. This procedure does not change the accuracy of the measurements and has the decided advantage that high counting rates can be handled with a conventional cable.

For a better understanding of the invention reference may be had to the accompanying drawing in which the single figure is a vertical sectional elevation through a bore hole in which a logging instrument embodying the scale circuit is suspended from the surface by means of a cable.

Referring to the drawing, a bore hole 10 is shown as traversing subsurface formations such as the one indicated at 12. Although no casing is shown in the hole it is understood that a casing may be present since it has substantially no effect upon the measurements to be made. Suspended within the hole by means of the conductor cable 14 is a logging instrument housing 16, this instrument being adapted to be lowered and raised through the hole by means of the cable, which at the surface passes over a suitable cable measuring device 18 providing an indication of the depth of the instrument in the hole at all times.

Within the housing 16 and preferably near the bottom thereof is a source 20 of primary radiation such as a neutron source comprising a mixture of radium and beryllium. Assuming that a neutron-gamma ray log is to be made, a gamma ray detector of the pulse-producing type is disposed above the source 20. The detector 22 may be a conventional Geiger-Mueller counter although it is preferred that a gamma ray counter be used of the type disclosed in the U. S. Letters Patent granted to D. G. C. Hare March 19, 1946, Number 2,397,071. Between the source 20 and the detector 22 is a shield layer 24 of a substance such as lead, capable of absorbing the direct gamma rays which would otherwise tend to pass from the source directly to the detector. Above the detector 22 and connected electrically thereto is a conventional amplifying circuit 26 which serves the purpose of preamplifying or equalizing the pulses produced by the detector 22. Connected to receive the output of the preamplifier 26 is a suitable scaling circuit 28 which, as has been described hereinabove, serves to reduce the number of preamplified pulses by a predetermined proportion. Assuming that the scaling circuit 28 is designed to have a scale of eight, for every eight pulses in the output of the preamplifier one pulse will be produced. The output of the scaling circuit is led to another amplifier or output stage 30 of conventional form, this circuit serving to impress the scaled down pulses upon the lower end of the cable 14. The upper end of the cable is connected to a suitable amplifier 32, the output of which in turn is led to a recording device 34.

As has been stated, the scaling circuit 28 may be of conventional type as is well known to those familiar with the measurement of radiation. A typical scaling circuit is described and illustrated on pages 287 through 289 of the book "Procedures in Experimental Physics" by Strong published in 1946 by Prentice-Hall, Inc.

Still assuming that a neutron-gamma ray log is being made, fast neutrons from the source 20 pass outwardly to bombard and penetrate the formations such as that illustrated at 12. Within the formation 12 the neutrons, due to collision with the atoms of the formation, may cause gamma rays to be induced, some of these induced gamma rays passing back to the hole where they strike the detector 22 to cause electrical pulses to be produced therein. Depending upon the nature of the formation 12 and particularly if that formation contains a considerable amount of hydrogen such as that in water or hydrocarbon oil the number of pulses produced in the detector 22 by the induced gamma rays will be so intense i. e., the counting rate of the detector will be so high that the pulses could not be clearly and efficiently transmitted over the cable. However, with the interposition of the scaling circuit 28 between the preamplifier 26 and the output stage 30 there will, in the case described, be but one-eighth as many pulses to be transmitted over the cable and this lower number of pulses can be efficiently transmitted and recorded.

Assuming now that a neutron-neutron log is being made, the detector 22 will preferably be in the form of a proportional counter such as is described, for example in the U. S. Letters Patent of Gerhard Herzog and K. C. Crumrine No. 2,443,731, granted June 22, 1948. The fast neutrons from the source 20 will, due to nuclear collision of the neutrons with the atoms of the formation, be scattered and slowed down therein, some of the slowed neutrons passing to the hole 10 where they strike the neutron detector 22. The pulses from the detector 22 will, as has been described with reference to neutron-gamma ray logging, be preamplified at 26, scaled down at 28 and transmitted to the surface through the output stage 30 and the cable 14. If desired the circuit 26 may include discriminating means, as is well known, for selecting only the larger pulses from the detector 22, these larger pulses being produced by the detected neutrons, while the smaller pulses which may be produced due to scattered or induced gamma rays will be suppressed.

Obviously many modifications and variations of the invention, as hereinbefore set forth, may be made without departing from the spirit and scope thereof, but only such limitations should be imposed as are indicated in the appended claims.

I claim:

1. The method of logging a borehole which comprises bombarding the formations surrounding the hole with neutrons whereby gamma rays are emitted in the formations due to nuclear collision of the neutrons with the atoms thereof, producing electrical pulses by said gamma rays entering the borehole, amplifying and equalizing said pulses, reducing the number of the amplified pulses per unit time by a fixed proportion, further amplifying the pulses after they are thus reduced in number, transmitting the amplified reduced number of pulses to the surface, again amplifying the reduced number of pulses at the surface and recording the finally amplified pulses.

2. A device for logging a borehole traversing subsurface formations comprising an instrument housing adapted to be passed through the hole, a cable for supporting said housing in its travel through the hole, a source of neutrons in the housing, pulse producing means for detecting within the housing gamma rays produced in the formations due to neutron bombardment, means for amplifying and equalizing the pulses from said detecting means, a scaling circuit for reducing the number of said pulses per unit time by a fixed proportion, an output amplifying stage for the pulses reduced in number, the output from said amplifying stage being connected to the lower end of said cable, means connected to the surface end of said cable for further amplifying the pulses transmitted upwardly over the cable, and means for recording the output of the last named amplifier.

GERHARD HERZOG.

References Cited in the file of this patent

UNITED STATES PATENTS

| Number | Name | Date |
|---|---|---|
| 2,308,361 | Fearon | Jan. 12, 1943 |
| 2,412,669 | Bedford | Dec. 17, 1946 |
| 2,412,670 | Epstein | Dec. 17, 1946 |
| 2,493,536 | Herzog | Jan. 3, 1950 |

OTHER REFERENCES

"Procedures in Experimental Physics," Strong, published in 1946 by Prentice-Hall, Inc., New York city, pp. 286–289 (copy in Div. 54).